(12) United States Patent
Kim (10) Patent No.: US 9,239,657 B2
(45) Date of Patent: Jan. 19, 2016

(54) CHARACTERS INPUT METHOD

(75) Inventor: Youn Soo Kim, Seoul (KR)

(73) Assignee: INTELLECTUAL DISCOVERY, INC., Seoul (KR)

( * ) Notice: Subject to any disclaimer, the term of this patent is extended or adjusted under 35 U.S.C. 154(b) by 75 days.

(21) Appl. No.: 12/742,636

(22) PCT Filed: Oct. 24, 2008

(86) PCT No.: PCT/KR2008/006304
§ 371 (c)(1),
(2), (4) Date: May 12, 2010

(87) PCT Pub. No.: WO2009/066878
PCT Pub. Date: May 28, 2009

(65) Prior Publication Data
US 2011/0107240 A1    May 5, 2011

(30) Foreign Application Priority Data
Nov. 22, 2007 (KR) .................. 10-2007-0119890

(51) Int. Cl.
*G06F 3/00* (2006.01)
*G06F 3/0481* (2013.01)
*G06F 3/023* (2006.01)

(52) U.S. Cl.
CPC ............ *G06F 3/0481* (2013.01); *G06F 3/0237* (2013.01)

(58) Field of Classification Search
CPC ..... G06F 3/0237; G06F 3/0233; G06F 21/83; G06F 3/0482; G06F 3/0487; G06F 3/0489; G06F 17/30253; G06Q 10/101; G06Q 10/063; G06Q 10/10; G06Q 30/02; G06Q 30/06; G06Q 30/0641; G06Q 30/0643; G06Q 50/01; H04M 1/72561; H04M 2250/74; H04N 1/00437
See application file for complete search history.

(56) References Cited

U.S. PATENT DOCUMENTS 7,098,896 B2 *   8/2006   Kushler et al. .............. 345/168
2002/0167545 A1 * 11/2002  Kang et al. ................. 345/780
(Continued)

FOREIGN PATENT DOCUMENTS

CN    1573659 A    2/2005
JP    9152955 A    6/1997
(Continued)

OTHER PUBLICATIONS

European Search Report for European Application No. 08853082.9, dated May 8, 2013.
(Continued)

*Primary Examiner* — Boris Pesin
*Assistant Examiner* — Ayesha Huertas Torres
(74) *Attorney, Agent, or Firm* — NSIP Law (57) ABSTRACT

A character input method according to the present invention includes the steps of when a user brings a mouse cursor into contact with the term input box of a web browser or website, or clicks the term input box one or more times, displaying a character input window, in which two or more character buttons and a completion button for enabling the input of a signal indicative of the completion of the entry of one or more characters are arranged, in abutment with the term input box; when one or more of the character buttons are clicked, entering one or more characters cor? responding to the clicked character buttons into the term input box; and when the completion button is clicked, generating an activation signal so that an search engine associated with the term input box is run using the characters, entered into the term input box, as search data.

10 Claims, 5 Drawing Sheets

(56) References Cited

U.S. PATENT DOCUMENTS

| | | |
|---|---|---|
| 2003/0182279 A1 | 9/2003 | Willows |
| 2004/0130575 A1* | 7/2004 | Tai et al. .................. 345/773 |
| 2005/0024322 A1 | 2/2005 | Kupka |
| 2005/0154718 A1* | 7/2005 | Payne et al. .................. 707/3 |
| 2005/0210402 A1* | 9/2005 | Gunn et al. .................. 715/773 |
| 2006/0265648 A1 | 11/2006 | Rainisto et al. |
| 2007/0016862 A1 | 1/2007 | Kuzmin |
| 2007/0209015 A1 | 9/2007 | Ritter |
| 2008/0115078 A1* | 5/2008 | Girgaonkar .................. 715/773 |

FOREIGN PATENT DOCUMENTS

| | | |
|---|---|---|
| JP | 10-154144 A | 6/1998 |
| JP | 2002-244798 A | 8/2002 |
| JP | 2002-373046 A | 12/2002 |
| JP | 2005-018222 A | 1/2005 |
| JP | 2005-346179 A | 12/2005 |
| KR | 1020020020489 | 3/2002 |
| KR | 1020020096487 | 12/2002 |
| KR | 1020050106613 | 11/2005 |
| WO | 0057265 A1 | 9/2000 |
| WO | 0233527 A2 | 4/2002 |
| WO | 2005008899 A1 | 1/2005 |

OTHER PUBLICATIONS

European Office Action mailed on Mar. 24, 2015 in counterpart European Patent Application No. 08853082.9. (7 pages).
Madden, Jack. "Enhance Web Interface Security with a Virtual Keyboard Login." Brianmadden. Jul. 30, 2006. Web Mar. 17, 2015. <https://www.brianmadden.com/blogs/brianmadden/archive/2006/07/30/enhance-web-interface-security-with-a-virtual-keyboard-login.aspx>. (3 pages).
Summons to attend Oral Proceedings Pursuant to Rule 115 (1) EPC issued on Nov. 16, 2015 of the corresponding European Application No. 08853082.9, 7 pages in English.

* cited by examiner

CHARACTERS INPUT METHOD

CROSS-REFERENCES TO RELATED APPLICATIONS

This application is a U.S. national phase application, pursuant to 35 U.S.C. §371 of PCT/KR2008/006304, filed Oct. 24, 2008, designating the United States, which claims priority to Korean Application No. 10-2007-0119890, filed Nov. 22, 2007. The entire contents of the aforementioned patent applications are incorporated herein by this reference.

TECHNICAL FIELD

The present invention relates generally to a character input method that is configured to enable a display to be made on a web browser and a user to input characters using a mouse, and, more particularly, to a character input method that is configured to minimize the distance of movement of a mouse cursor performed by a user, thereby improving the convenience of use.

BACKGROUND ART

Recently, there is a tendency of the whole world to be connected by a single network via the Internet communication network using computers. The Internet has been already developed into part of a life. The Internet is not temporarily used only by persons in a specific group for specific purposes, but has become means from and through which normal persons obtain living information and enjoy their leisure.

Although there may be many reasons for the increase in the population of the use of the Internet, the development of the operating system of Personal Computers (PCs) to the Windows Operating System that is easier and more convenient to use than Disk Operating System (DOS) that is difficult to use has played an important role.

One of the characteristics of the above-described Windows Operating System is that means for inputting commands is not limited to a keyboard but convenient and various input means, such as a mouse, a joystick and a digitizer, can be used at the same time, which enables a user to execute desired predetermined commands without being aware of the operating system or instructions of a computer system.

However, in the above-described environment, it is essential to use a keyboard in order to enter the address of a home page, an ID, a password, or a search term. This is fundamentally caused by the characteristic in which characters have many elements, that is, the English alphabet has 26 characters and the Korean alphabet has 33 characters (including consonant digraphs and vowel pairs).

Furthermore, a handicapped person who cannot use a keyboard due to the impairment of his or her hands but can use a mouse or a joystick or an old person or a child who is poor at the manipulation of a keyboard inevitably visits only frequently visited domains solely depending on a mouse because he or she must enter the address of a desired home page into an address bar in the form of a text character string while browsing the Internet, so that there arises a problem in that he or she limitedly uses the Internet that includes great functionality and a large amount of information.

In order to overcome the above problem, a character input window configured to enable desired characters to be input only using a mouse and a character input method using the character input window were proposed.

The prior art character input window and the prior art character input method using the character input window will be described in detail below with reference to the accompanying drawings.

Figure 1:
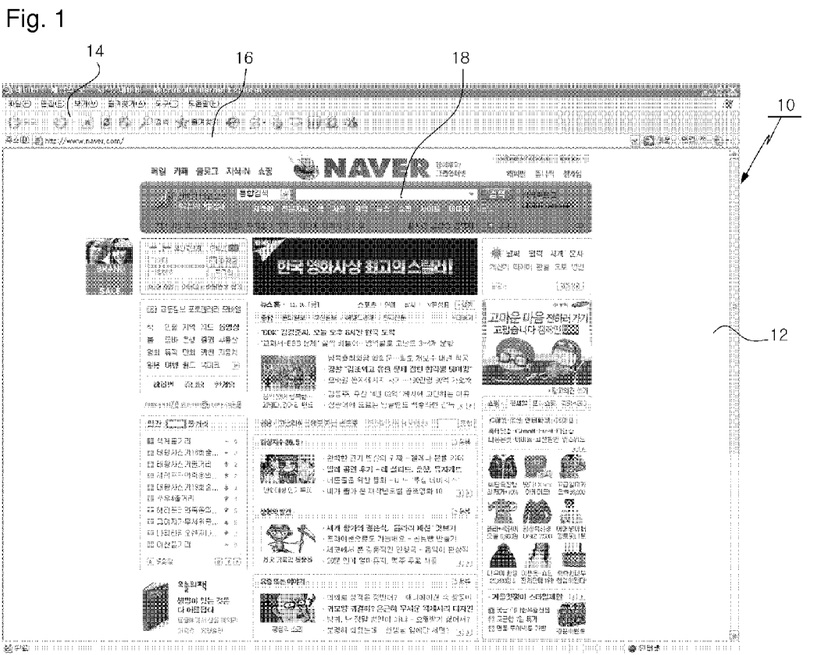
FIG. 1 is a diagram showing an example of a screen of a typical web browser.
Figure 2:
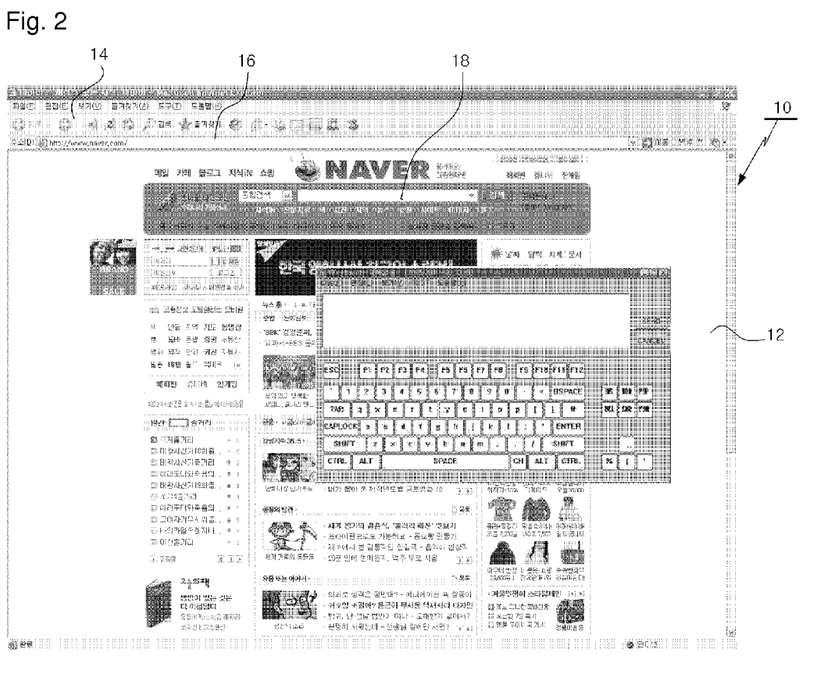
FIG. 2 is a diagram showing a state in which a prior art character input window is displayed on a web browser.
Figure 3:
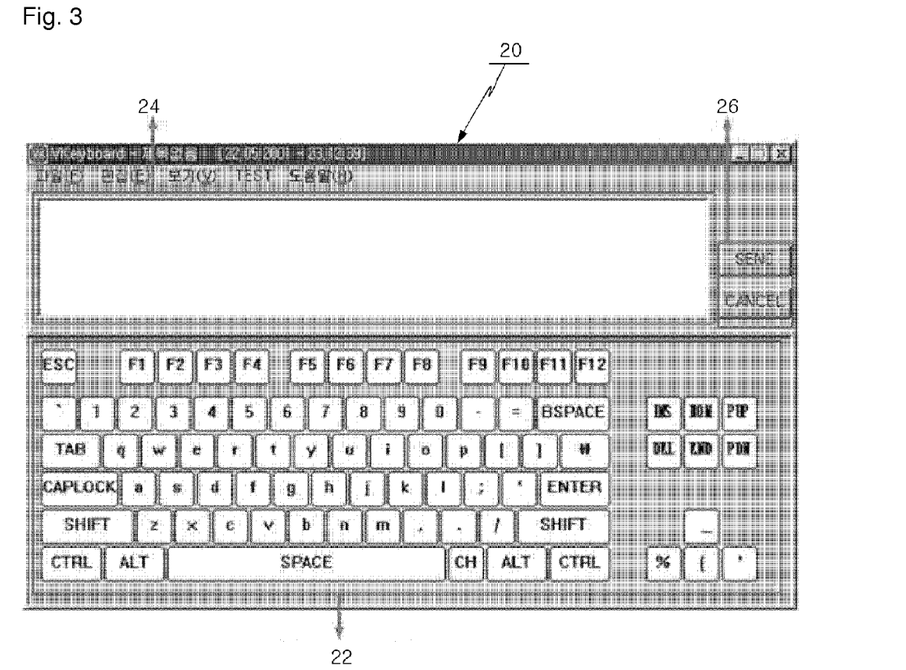
FIG. 3 is a diagram showing the construction of the screen of the prior art character input window.

FIG. 1 is a diagram showing an example of a screen of a typical web browser, FIG. 2 is a diagram showing a state in which a prior art character input window is displayed on a web browser, and FIG. 3 is a diagram showing the construction of the screen of the prior art character input window.

As shown in FIG. 1, a typical web browser 10 includes a web page window 12 for displaying an accessed web page, a toolbar 14 for displaying tools required for the use of the web browser 10, and an address bar 16 for enabling the address of a website to be entered therein. Furthermore, when an accessed web page corresponds to a portal website or a website, a search box 18 for enabling a search term to be entered therein appears on a web page.

In this case, when a mouse cursor is located on the address bar 16 or the search box 18 and a signal is input using a function button (not shown) of a mouse so as to activate a character input window, a character input window 20 appears on the web browser, as shown in FIG. 2. The character input window 20 is provided with a virtual keyboard 22 configured to have an arrangement substantially identical to the key arrangement of an actual keyboard, a preview box 24 for displaying a relevant character when a user locates a mouse cursor on the virtual keyboard 22 and performs a click, and activation buttons 26 for generating an activation signal to send or cancel an input character.

Accordingly, when a user clicks a character key of the virtual keyboard 22 using a mouse, a corresponding character appears in the preview box 24. When the corresponding activation button 26 is pressed after the completion of the input of the character, the character appearing in the preview box 24 is entered in the address bar 16 or the search box 18. That is, when the prior art character input window 20 is used, characters can be entered into the web browser 10 only using the mouse.

DISCLOSURE OF INVENTION

Technical Problem

However, the above-described character input window 20 has a disadvantage in that the character input window 20 is displayed at a predetermined location, that is, a location unrelated to an address bar 16 clicked by a user, when the user clicks the address bar 16 and inputs a character input window activation signal, so that in the case where the distance between the address bar 16 and the virtual keyboard 22 is long, as shown in FIG. 2, a mouse cursor must be moved a long distance, with the result that there is a disadvantage in that the use thereof is inconvenient.

Furthermore, in order to access a website corresponding to entered characters after entering the desired characters in the preview box 24 using the virtual keyboard 22, the action of clicking an activation button 26 to enter input characters into the address bar 16 and the action of running the web browser to access a website corresponding to characters entered in the address bar 16 (the action of clicking a 'Go' button disposed on the right side of the address bar or pressing the 'Enter' key of a keyboard) must be performed separately, so that there is an disadvantage in that the use thereof is inconvenient.

Furthermore, since the above-described prior art character input window 20 has the arrangement of buttons identical to the key arrangement of an actual keyboard, a user who does not remember the key arrangement of the actual keyboard experiences great difficulty in entering characters.

Accordingly, the present invention has been made keeping in mind the above problems occurring in the prior art, and an object of the present invention is to provide a character input window that is configured such that the operation of entering characters in the address bar of a web browser or the search box of a website can be performed very conveniently only through the manipulation of a mouse and even a person who does not remember the key arrangement of a keyboard can easily enter characters.

Technical Solution

In order to accomplish the above object, the present invention provides a character input method, including the steps of:

when a user brings a mouse cursor into contact with the term input box of a web browser or website, or clicks the term input box one or more times, displaying a character input window, in which two or more character buttons and a completion button for enabling the input of a signal indicative of the completion of the entry of one or more characters are arranged, in abutment with the term input box;

when one or more of the character buttons are clicked, entering one or more characters corresponding to the clicked character buttons into the term input box; and when the completion button is clicked, generating an activation signal so that an search engine associated with the term input box is run using the characters, entered into the term input box, as search data.

Advantageous Effects

In accordance with a character input method according to the present invention, when characters are entered into a term input box, such as the address bar of a web browser or the search box of a website, only through the manipulation of a mouse, the distance of movement of a mouse cursor can be minimized, so that there are advantages in that characters can be entered very conveniently and even a person who does not remember the key arrangement of a keyboard can easily enter characters.

BEST MODE FOR CARRYING OUT THE INVENTION

A character input method according to the present invention is chiefly characterized in that when one or more characters are entered into a term input box only through the manipulation of a mouse, the distance of movement of the mouse cursor is minimized, thereby facilitating the input of the characters.

Embodiments of the character input method according to the present invention will be described in detail below with reference to the accompanying drawings.

Figure 4:
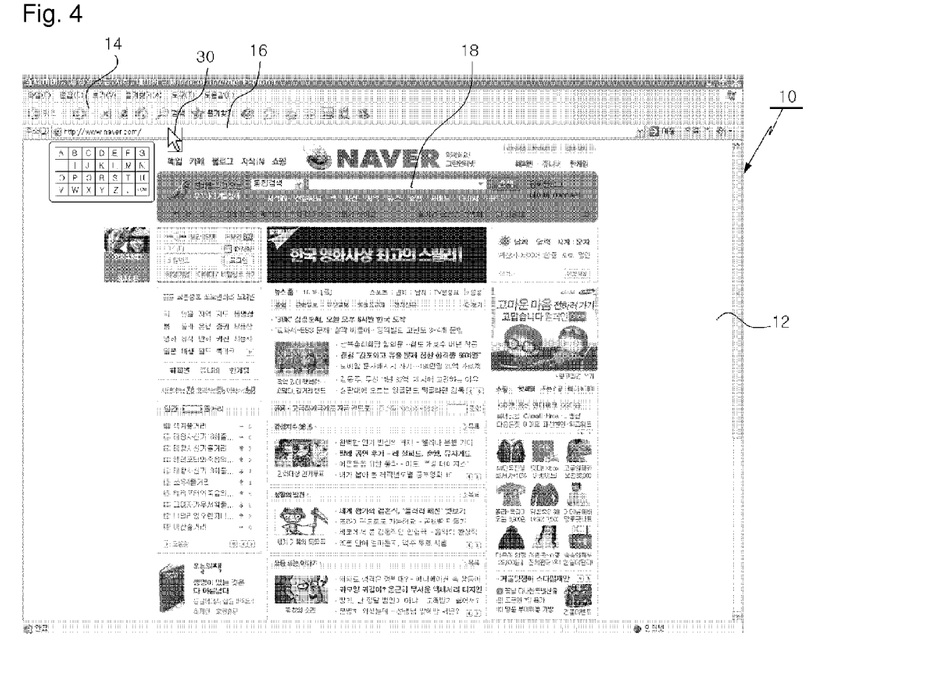
FIG. 4 shows a state in which a character input window is displayed when one or more characters are entered into the address bar of a web browser.
Figure 5:
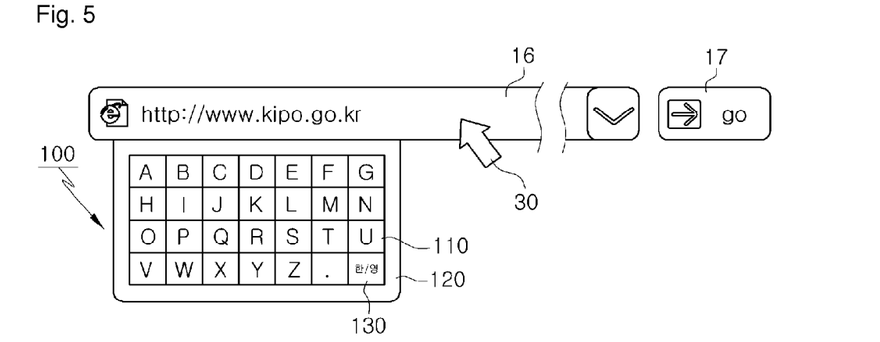
FIG. 5 shows the construction of a character input window for input of the Korean alphabet or numerals.

FIG. 4 shows a state in which a character input window is displayed when one or more characters are entered into the address bar of a web browser, and FIG. 5 shows the construction of a character input window for input of the Korean alphabet or numerals.

When a user selects any one term input box from among a plurality of term input boxes present in a web browser 10 and a website, the corresponding term input box should be clicked.

Here, in the character input method according to the present invention, when any one term input box is selected, a character input window 100 is displayed in abutment with the term input box. The character input window 100 is chiefly characterized in that it is displayed near a term input box (hereinafter 'selected term input box') desired by the user and selected from among a plurality of term input boxes present in the web browser 10 and a website, thereby minimizing the distance to the selected term input box.

For example, when a user brings a mouse cursor 30 into contact with the address bar 16 and performs a click so as to enter one or more characters into the address bar 16 of web browser 10, the character input window 100 is displayed in close contact with the lower side of the address bar 16, as shown in FIG. 4. When the character input window 100 is displayed immediately below the address bar 16 as described above, the user can manipulate the character input window 100 even though the user moves the mouse cursor 30 downwards only slightly, so that characters can be entered more rapidly and conveniently only using a mouse.

Here, although the character input window 100 may be displayed in close contact with the upper, right or left side of the address bar 16, the address bar 16 may be covered with a mouse cursor when the character input window 100 is displayed above the address bar 16, and the distance of movement of the mouse cursor 30 to the character input window 100 is long when the address bar 16 is displayed on the right or left side of the address bar 16, with the result that it is preferred that the character input window 100 be displayed immediately below the address bar 16, as shown in the present embodiment.

Furthermore, in the character input window 100, character buttons 110 for enabling the selection of characters to be entered, a completion button 120 for enabling a signal indicative of the completion of the entry of characters, and one or more function buttons 130 for enabling the performance of various functions.

Here, since the alphabet characters are mostly entered into the address bar 16, the character buttons 110 are designated as buttons for the English alphabet characters A~Z and a button for '.' so as to enter the English alphabet. Meanwhile, although in a typical keyboard, alphabet characters frequently used are arranged in the center portion of the keyboard and alphabet characters not frequently used are arranged on the outside of the keyboard, the character input window 100 is additionally characterized in that the character buttons 110 are arranged in alphabetical order. When the character buttons 110 are arranged in alphabetical order, even a beginning typist who does not remember the key arrangement of an English keyboard can find characters to be entered faster, so that there is an advantage in that the English alphabet characters can be entered more easily.

Furthermore, in the character input window 100, one or more of various function buttons 130, such as a 'Korean/English' button for switching the character buttons 110 to a Korean alphabet input mode so as to input the Korean alphabet characters, as shown in FIG. 5, or a 'Del' button for enabling the deletion of one or more erroneously entered characters, although not shown in the present embodiment, may be displayed.

Since the function buttons 130 have the same functions as a plurality of function keys provided in a typical keyboard, a detailed description thereof will be omitted here. That is, in the character input window 100, even any function key provided in a typical keyboard may be displayed according to the user's need.

In the character input window 100, the completion button 120 for enabling the input of a signal indicative of the completion of the entry of one or more characters maybe displayed, in addition to the character buttons 110 and the function button 130.

The completion button 120 may be configured to generate a signal that is capable of making the entire character input window 100 disappear when a user clicks the completion button 120. When the entire character input window 100 disappears as described above, there arise effects in that the user can be notified of the completion of the entry of the characters and a screen covered with the character input window 100 can be shown to the user again.

However, if the completion button 120 simply functions to make the character input window 100 disappear, there occurs inconvenience in that the user should click a 'Go' button 17 on the right side of the address bar 16 to access a website entered in the address bar 16 after clicking the completion button 120. Accordingly, it is preferred that the completion button 120 be configured to generate an activation signal so that when the completion button 120 is clicked by the user, a search engine associated with the address bar 16 can be run with the entered characters used as search data, that is, a website entered in the address bar 16 can be accessed.

Meanwhile, the completion button 120 may be formed to have the same size and shape as each character button 110 or function button 130 shown in FIG. 5 and be arranged together with the character buttons 110 and the function buttons 130, in which case if the distance between the last clicked character button 110 and the completion button 120 is long, there occurs inconvenience in that the mouse cursor 30 should be moved a long distance. For example, when the last clicked character button 110 is located on the upper right corner and the completion button 120 is located on the lower left corner, the character button 110 is clicked last and then the mouse cursor 30 should be moved a distance corresponding to the diagonal line of the character input window 100, so that the inconvenience of use may occur. Although it is apparent that if a plurality of completion buttons 120 is arranged at a plurality of locations in the character input window 100, the above-described inconvenience can be overcome, the provision of the plurality of completion buttons 120 causes problems in that the arrangement of the character buttons 110 is made irregular and the entire size of the character input window 100 is increased.

Accordingly, it is preferred that the completion button 120 be formed in a shape surrounding the portion of the arrangement of the character buttons 110 (in the present embodiment, a square frame shape) so that the distance to the completion button can be minimized regardless of the last entered character button 110. When the completion button 120 is formed to surround the arrangement of the character buttons 110 as described above, the distance over which the mouse cursor 30 must be moved to the completion button 120 after the clicking of the character button 110 can be minimized by clicking the upper side of the completion button 120 when the last clicked character button 110 is one of the 'A~G' buttons, and clicking the lower side of the completion button 120 when the last clicked character button 110 is one of the 'V~Z' buttons.

Furthermore, although in the present embodiment, the case where the character input window 100 is displayed only when the address bar 16 is clicked is described, the character input window 100 may be configured to be displayed through the action of the user's bringing the mouse cursor 30 into contact with the address bar 16. Since the construction in which a separate output window is displayed by bringing the mouse cursor 30 into contact with something is widely used in the technical field to which the present invention pertains, a detailed description thereof will be omitted here.

Figure 6:
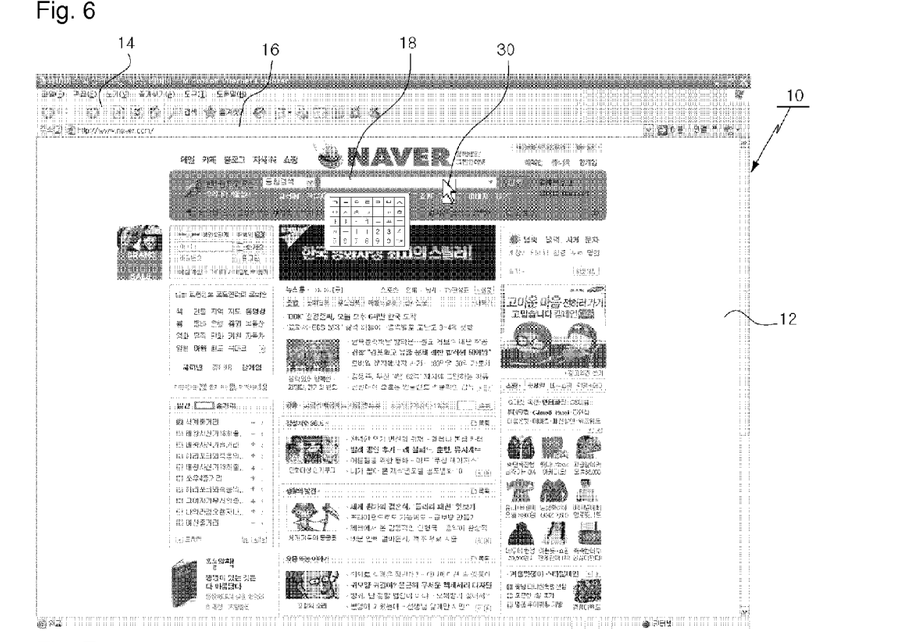
FIG. 6 is a state in which a character input window is displayed when one or more characters are entered into the search box of a website.
Figure 7:
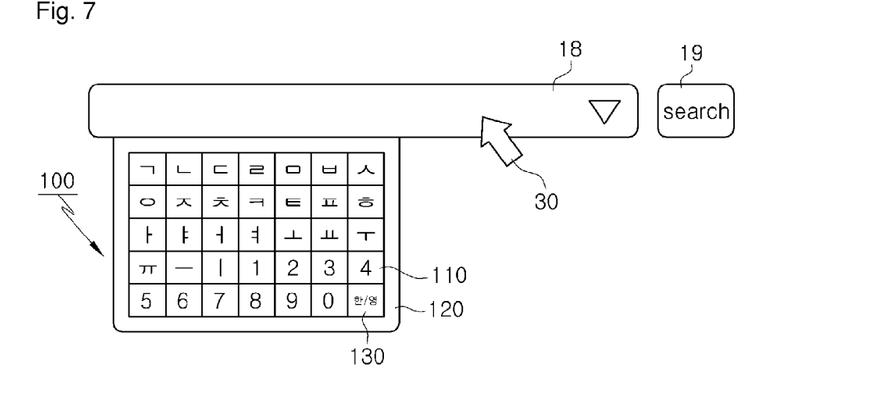
FIG. 7 shows the construction of a character input window for the input of the English alphabet characters.

FIG. 6 is a state in which the character input window 100 is displayed when one or more characters are entered into the search box 18 of a website, and FIG. 7 shows the construction of a character input window 100 for the input of the English alphabet characters.

The character input window 100 may be displayed in abutment with the address bar 16, as shown in FIGS. 4 and 5, and may be displayed when a mouse is brought into contact with the search box 18 of a website or the search box 18 is clicked, as shown in FIGS. 6 and 7.

Here, since Korean alphabet characters and numerals are generally and mostly entered into the search box 18, the character buttons 110 are configured to enter the consonants and vowels of the Korean alphabet and numerals. In this case, since the character buttons 110 associated with the consonants and vowels of the Korean alphabet are arranged in the order of the Korean alphabet and the character buttons 110 associated with numerals are arranged in numerical order, even a user who does not remember the key arrangement of a Korean keyboard can rapidly and conveniently enter Korean alphabet characters and numerals that are desired to be entered.

It is apparent that the character input windows 100 shown in FIGS. 6 and 7 can be converted into the character input windows 100 for the entry of the English alphabet characters shown in FIGS. 4 and 5 by clicking the function button 130 for switching entered characters between the English and Korean alphabets.

Furthermore, the character input window 100 may be utilized not only when the address bar 16 or search box 18 is used but also when input boxes for enabling the entry of an ID and a password to log in to a website are used.

Since the manipulation and operation of the character input window 100 shown in FIGS. 6 and 7 are substantially the same as those of the character input window 100 shown in FIGS. 4 and 5, a detailed description thereof will be omitted here.

Figure 8:
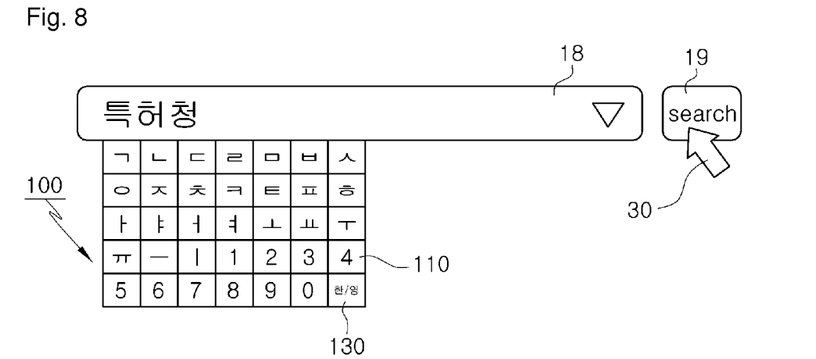
FIG. 8 shows the second embodiment of the character input window.

FIG. 8 shows the second embodiment of the character input window 100.

The character input window 100 may be configured such that the completion button 120 shown in FIGS. 4 to 7 is left out. That is, the character input window 100 may be constructed only with character buttons 110 and a completion button 120 as shown in FIG. 8, or only with character buttons 110.

In the case where the completion button 120 is left out, searching may be performed using entered characters by clicking a search button 19 disposed on one side of the search box 18 after the completion of the entry of the characters, as shown in FIG. 8. In the case where the completion button 120 is left out in the character input window 100, there is inconvenience in that the mouse cursor 30 must be moved to the search button 19 after the entry of one or more characters, but there are advantages in that the size of the character input window 100 can be reduced and a program for implementing the character input window 100 is simplified.

Figure 9:
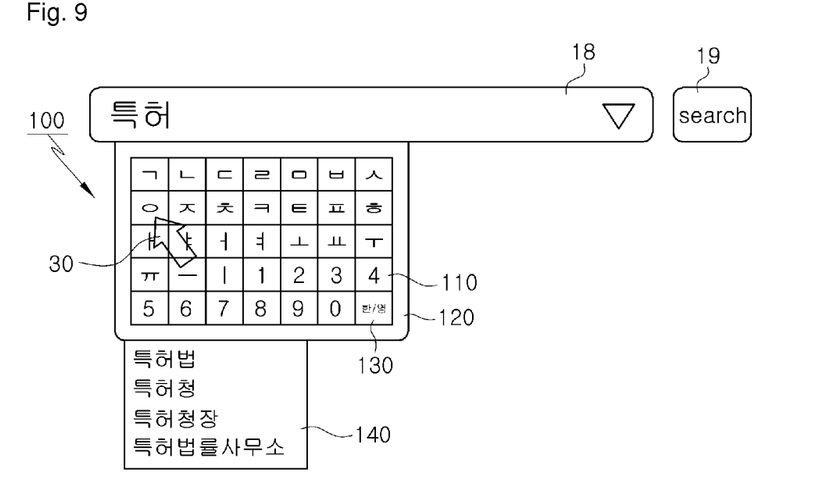
FIG. 9 shows the third embodiment of the character input window.
Figure 10:
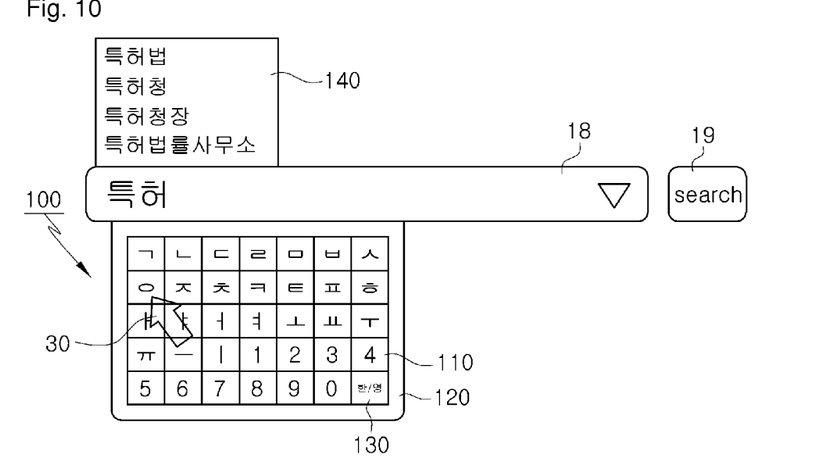
FIG. 10 shows the fourth embodiment of the character input window.

FIG. 9 shows the third embodiment of the character input window, and FIG. 10 shows the fourth embodiment of the character input window.

The character input window 100 may be configured such that an extended term window 140 for showing extended terms including entered term or characters can be additionally displayed when a user enters the term or characters into the search box 18.

For example, when a user enter the term 'patent' in the search box 18, as shown in FIGS. 9 and 10, extended terms including the term 'patent' entered by the user, that is, 'patent law', 'patent and law firm', 'patent office', 'patent office commissioner' and the like, may be displayed in the extended term window 140.

When the separate extended term window 140 is additionally displayed as described above, a user may select any one extended term from among extended terms displayed in the extended term window 140 without entering an entire term desired by the user, so that there is an advantage in which characters can be entered very conveniently. Since such an extended term window 140 is widely used as a box for entering an ID or as a search box for searching for a shopping item in an Internet shopping mall, a detailed description thereof will be omitted here.

In this case, it is preferred that in order to prevent the character button 110, the function button 120 or the completion button 120 from being covered with the extended term window 140, the extended term window 140 be displayed below the character input window 100, as shown in FIG. 9, or be displayed in abutment with the contour of the search box 18, as shown in FIG. 10.

When the extended term window 140 is located immediately below the character input window 100, as shown in FIG. 9, the extended term window 140 is located adjacent to a region for entering characters, that is, the character buttons 110, so that there is an advantage in that it is possible to rapidly select an extended term displayed in the extended term window 140 while characters are entered.

Furthermore, when the extended term window 140 is displayed in direct contact with the contour line of the search box 18, as shown in FIG. 10, there is an advantage in that a term entered into the search box 18 and a term displayed in the extended term window 140 can be compared with each other more easily.

It is apparent that the location of the display of the extended term window 140 may be changed to one of various locations including the locations described in the present embodiment.

Figure 11:
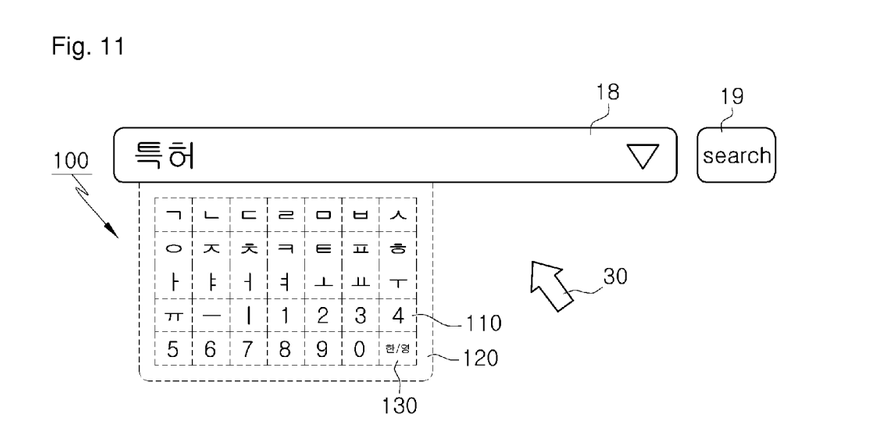
FIG. 11 shows the fifth embodiment of the character input window.

FIG. 11 shows the fifth embodiment of the character input window.

The character input window 100 may be configured such that it can be made to immediately disappear through a user's manipulation in the case where the user desires to view a screen covered with the character input window 100 while he or she manipulates the character input window 100.

In this case, the character input window 100 may be implemented using a program so that it can disappear when a user locates the mouse cursor 30 in a portion of a screen outside the character input window 100, as shown in FIG. 11, or it can disappear when a user clicks a portion of a screen outside the character input window 100.

The above-described manipulation of locating the mouse cursor 30 on a portion of a screen outside the character input window 100 or clicking a portion of a screen outside the character input window 100 can be performed very easily compared to the manipulation of selecting respective buttons provided in the character input window 100. Accordingly, when programming is performed such that the character input window 100 disappears by locating the mouse cursor 30 in a portion of a screen outside the character input window 100 or clicking a portion of a screen outside the character input window 100, there is an advantage in that the user enables the character input window 100 to disappear more easily.

Furthermore, the character input window 100 may be configured to delete all characters and term entered into the search box 18 through a user's manipulation for the case where the user desires to delete all the characters and term entered by the user while the user enters the characters and term into the search box 18 through the manipulation of the character input window 100.

For example, the character input window 100 may be implemented using a program so that the characters and term entered into the search box 18 are deleted when the user locates the mouse cursor 30 on a portion of a screen outside the character input window 100, or that the characters and term entered into the search box 18 are deleted when the user clicks a portion of a screen outside the character input window 100.

It is apparent that the character input window 100 may be implemented using a program so that the above-described two functions can be implemented at the same time, that is, so that through a user's manipulation, the character input window 100 disappears in a screen and the characters and term entered into the search box 18 can be deleted.

Furthermore, although the five embodiments of the character input window 100 shown in FIGS. 7 to 11 have been described as being displayed only in conjunction with the search box 18, the character input windows 100 of the respective embodiments may be displayed in conjunction with the address bar 16.

Although the present invention has been described in detail using the preferred embodiments, the scope of the present invention is not limited to specific embodiments, and should be interpreted based on the attached claims. Furthermore, it can be appreciated by one having an ordinary skill in the related technical field that many modifications and variations can be made without departing from the scope of the present invention.

The invention claimed is:

1. A character input method comprising the steps of:

displaying, when a user brings a mouse cursor into contact with a term input box of a web browser or website or clicks the term input box, a character input window in abutment with the term input box, the character input window comprising a first section that includes a plurality of character buttons and a second section that includes a completion button for enabling input of a signal indicative of completion of character entry;

entering, when a character button of the plurality of character buttons is clicked, a character corresponding to the clicked character button into the term input box;

generating, when the completion button is clicked, an activation signal that causes a search engine associated with the term input box to run is run using as search data the character entered into the term input box;

making, when the user locates the mouse cursor on a portion of a screen outside the character input window, the character input window disappear and the portion of the screen outside the character input window remains visible; and displaying an extended term window that displays an extended term including the character entered in the term input box, wherein the extended term window is displayed in contact with a contour of the term input box or the character input window, wherein the character input window is displayed in contact with one side of the contour of the term input box, and the extended term window is displayed in contact with opposite side of the contour of the term input box.

2. The character input method as set forth in claim 1, wherein the second section, which includes the completion button, surrounds the first section, which includes the character buttons.

3. The character input method as set forth in claim 1, wherein the character buttons are arranged in an alphabetical order, a numerical order, or both.

4. The character input method as set forth in any one of claims 1 to 3, further comprising deleting, when the user locates the mouse cursor on a portion of the screen outside the character input window or clicks a portion of the screen outside the character input window, the character entered into the term input box.

5. The character input method as set forth in claim 1, wherein the first section further includes a function button.

6. The method of claim 5, further comprising:
switching from a display of Korean character buttons to a display of English character buttons, when the user clicks the function button while Korean character buttons are displayed, and
switching from a display of English character buttons to a display of Korean character buttons, when the user clicks the function button while English character buttons are displayed.

7. The method of claim 1, wherein the second section constitutes a rectangular frame surrounding the first section.

8. The method of claim 1, wherein the character buttons are arranged within the first section so as to minimize the distance between the second section and a character button, of the displayed character buttons, disposed farthest from the second section.

9. A character input method comprising the steps of:
displaying, when a user brings a mouse cursor into contact with a term input box of a web browser or website or clicks the term input box, a character input window in abutment with the term input box, the character input window comprising a first section that includes a plurality of character buttons and a second section that includes a completion button for enabling input of a signal indicative of completion of character entry;

entering, when a character button of the plurality of character buttons is clicked, a character corresponding to the clicked character button into the term input box;

displaying an extended term window that displays an extended term including the character entered in the term input box;

generating, when the completion button is clicked, an activation signal that causes a search engine associated with the term input box to run using as search data the character entered into the term input box; and making, when the user locates the mouse cursor on a portion of a screen outside the character input window or clicks the portion of a screen outside the character input window, a character and term entered into the term input box deleted, wherein the character input window is displayed in contact with one side of the contour of the term input box, and the extended term window is displayed in contact with opposite side of the contour of the term input box, wherein when the user locates the mouse cursor on a portion of a screen outside the character input window, the character input window disappears and the portion of the screen outside the character input window remains visible.

10. A display apparatus comprising:
a main area including a term input box of a web browser or website;
a popup area popped up when a user brings a mouse cursor into contact with the term input box;
wherein the popup area includes a character input window which is displayed in abutment with the term input box,
wherein the character input window comprises a first section that includes a plurality of character buttons and a second section that includes a completion button for enabling input of a signal indicative of completion of character entry,
wherein when a character button of the plurality of character button is clicked, a character corresponding to the clicked character button is entered into the term input box,
wherein when the completing button is clicked, an activation signal that causes a search engine associated with the term input box to run using as search data the character entered into the term input box generates,
wherein when the user locates the mouse cursor on the main area, the popup area is disappeared and the main area remains visible,
wherein the popup area further includes an extended term window that displays an extended term including the character entered in the term input box,
wherein the character input window is displayed in contact with one side of the contour of the term input box, and
wherein the extended term window is displayed in contact with opposite side of the contour of the term input box.

* * * * *